United States Patent [19]

Tellis

[11] 4,299,802

[45] Nov. 10, 1981

[54] PROCESS FOR REMOVING CARBONYL SULFIDE FROM GASEOUS STREAMS

[75] Inventor: Cyril Tellis, Charleston, W. Va.

[73] Assignee: Union Carbide Corporation, New York, N.Y.

[21] Appl. No.: 135,784

[22] Filed: Mar. 31, 1980

[51] Int. Cl.$^3$ .............................................. B01D 53/34
[52] U.S. Cl. .................................... 423/244; 252/189; 252/192; 252/475
[58] Field of Search ................... 423/230, 231, 244 R, 423/244 A, 622; 55/73, 84; 252/475, 182, 184, 189, 190, 191

[56] References Cited

U.S. PATENT DOCUMENTS

| | | | |
|---|---|---|---|
| 2,239,000 | 4/1944 | Groombridge et al. | 252/373 |
| 3,441,370 | 4/1969 | Gutmann et al. | 423/244 |
| 3,492,083 | 1/1970 | Lowicki et al. | 423/244 |
| 3,669,617 | 6/1972 | Lowicki et al. | 423/244 |
| 4,009,009 | 2/1977 | Massoth et al. | 55/73 |
| 4,088,736 | 5/1978 | Courty et al. | 423/230 |
| 4,128,619 | 12/1978 | Robinson | 423/244 |

FOREIGN PATENT DOCUMENTS 12540 3/1976 United Kingdom .

OTHER PUBLICATIONS

United Catalysts, Inc., Product Bulletin C7-0679.

*Primary Examiner*—Earl C. Thomas
*Attorney, Agent, or Firm*—Bernard Lieberman

[57] ABSTRACT

This invention relates to a process for reducing the carbonyl sulfide content of a gaseous stream which has a concentration of carbonyl sulfide of from at least 1 to about 100 parts per million, by volume, which comprises providing an absorbent bed wherein the absorbent comprises zinc oxide and contains no more than 5%, by weight, of an oxide of an alkli or alkaline earth metal, and contacting said process stream with said adsorbent bed at a temperature of from about ambient to 250° C. for a period of time sufficient to remove at least 90% of the carbonyl sulfide content of said gaseous stream.

3 Claims, No Drawings

PROCESS FOR REMOVING CARBONYL SULFIDE FROM GASEOUS STREAMS

CROSS REFERENCE TO RELATED APPLICATION

This application is related to copending U.S. Application Ser. No. 135,779 filed on even date herewith, now U.S. Pat. No. 4,271,133 describes a process for reducing the HCN content of a gaseous stream using a zinc oxide adsorbent.

BACKGROUND

This invention relates to the removal of carbonyl sulfide from gaseous process streams which contain such contaminant in a concentration greater than 1 part per million, by volume. More particularly, the invention relates to the treatment of such process streams with adsorbent beds containing zinc oxide to effect a near complete removal of the carbonyl sulfide in such streams.

Synthesis gas is an increasingly important feedstock in the chemical industry. Existing or proposed commercial processes using synthesis gas (i.e. gaseous mixtures containing hydrogen and carbon monoxide) include processes for the manufacture of methanol, ethanol, the production of aldehydes by the oxo process, the production of glycols using rhodium catalysts, and the production of purified hydrogen and carbon monoxide streams. In most of these processes, the use of sensitive catalyst materials requires that contaminants such as sulfur compounds and hydrogen cyanide be removed from the gas to concentration levels of less than 1 part per million, by volume (hereinafter referred to as "ppmv"), and often to levels below 0.1 ppmv.

Synthesis gas mixtures typically contain a variety of impurities among which are sulfur compounds such as hydrogen sulfide ($H_2S$), carbonyl sulfide (COS), sulfur dioxide ($SO_2$), carbon disulfide ($CS_2$) and methyl mercaptan ($CH_3SH$), as well as hydrogen cyanide (HCN), hydrogen chloride (HCl) and others. The relative concentrations of these impurities in the gas depends on the feedstock from which the synthesis gas is derived. Generally, a gaseous feedstock, such as methane, introduces less contaminants into the synthesis gas than liquid feedstocks, such as naptha, gas oil, atmospheric residue (the bottom fraction obtained from an atmospheric crude refining still) and vacuum residue (the bottom fraction obtained from the vacuum refining of heavy feedstocks such as crude oil and atmospheric residue). Coal derived synthesis gas generally contains the highest concentration of sulfur compounds.

Present purification schemes typically utilize a reactive liquid absorbent such as aqueous ethanolamines, alkali carbonates and hydroxides, or sodium thioarsenite as a primary purification agent to absorb high levels of the various species of impurities and reduce them to levels of about 1 to 10 ppmv. Alternatively, a non-reactive physical absorbent such as methanol at cryogenic temperatures may be used as the primary purification agent. Purifying the gaseous stream to a higher degree with such absorbents is uneconomical because of the disproportionately large amounts of energy which would be required to regenerate the spent absorbent.

Accordingly, the effluent gas from a primary purification step usually requires further treatment to reduce the impurities to acceptable levels. Adsorbents to accomplish such purification are extensively described in the prior art. The prior art literature relating to adsorbents for gaseous purification concerns itself, for the most part, with eliminating sulfur compounds from gas streams, in particular $H_2S$. Thus, for example, U.S. Pat. No. 3,441,370 describes the removal of $H_2S$ with the use of a zinc oxide adsorbent at a temperature from ambient to 800° F. The removal of COS and RSH is also suggested, but only at temperatures above 500° F. However, no data is provided in the patent to demonstrate the removal of COS with such adsorbent. U.S. Pat. No. 4,009,009 describes the removal of COS from arsenic-free gas streams with the use of alumina-supported lead oxide. Great Britain Application No. 012,540, filed Mar. 29, 1976 (corresponding to German Offenlegungsschrift No. 2,650,711) discloses the use of zinc oxide as an absorbent for hydrogen sulfide. The examples of the Application show the removal of carbonyl sulfide along with $H_2S$, but the presence of carbonyl sulfide in the inlet feed gas is said to be restricted to small amounts (page 4, col. 2). Thus, in the examples of the British Application, the maximum amount of COS in the gaseous feed stream to the adsorbent was 0.4 ppmv, as compared to the maximum amount of $H_2S$ which was 200 ppmv. Moreover, the examples of the application are deserving of further comment with regard to the ambiguity of the data concerning the removal of COS with zinc oxide. In Example I, the COS concentration in the feed gas to the zinc oxide adsorber was 0.13 ppmv and the exit concentration was 0.12 ppmv, a value essentially the same as the inlet concentration and within the experimental error of the measurement. In another experiment in Example I, the inlet concentration of COS was reported as 0.09 ppmv and the exit concentration was 0.11 ppmv, an apparent increase in the COS concentration. In Example II, two feed gases were used having COS concentrations of 0.07 and 0.04 ppmv, respectively, and the effluent gases were reported to have COS concentrations below these values. In Example III, the concentration of COS was reported as 0.4 ppmv in the feed gas and as 0.03 ppmv in the product gas. The erratic nature of the above-described data indicates that rather than being removed by adsorption on zinc oxide, COS was removed by adsorption on the metal surfaces of the tubing and the reactor which contacted the feed gas. Since it is known that COS is readily adsorbed on metal surfaces in amounts comparable to the very low COS concentrations which were present in the inlet feed gas, the data of these examples indicate nothing more than the expected removal of COS by adsorption on metal. Thus, the British Application does not disclose the efficacy of zinc oxide as an adsorbent for COS.

U.S. Pat. No. 3,492,083 broadly describes the removal of $H_2S$ and COS from an industrial gas using as an adsorbent a mixture comprising oxides of aluminum, zinc, iron and/or manganese in combination with oxides of the alkaline earth and/or alkali metals. Adsorption is carried out at a temperature of from 100° to 300° C. The examples of the patent only disclose the removal of $H_2S$ and $SO_2$ from the various gases. U.S. Pat. No. 4,128,619 discloses a desulfurization process carried out at a temperature from 100°–400° C. using zinc oxide as the adsorbent. Hydrogen sulfide is the only sulfur compound which is shown removed in the examples of the patent. U.S. Pat. No. 2,239,000 discloses the removal of sulfur from the gas mixtures comprising hydrogen and carbon monoxide at a temperature from 400° C.–600° C. using catalytic mixtures of zinc and iron oxides or zinc and chromium oxides.

Thus, while zinc oxide is generally known in the prior art as an adsorbent for the removal of $H_2S$ from gaseous streams, there has heretofore been no suggestion regarding its capability as an adsorbent for COS at temperatures below 500° F.

DETAILED DESCRIPTION OF THE INVENTION

The invention comprises a process for reducing the COS content of a gaseous process stream which has a concentration of COS of from at least 1 to about 100 ppmv which comprises providing an adsorbent bed for the removal of such COS impurity wherein the adsorbent in said bed is comprised of zinc oxide and contains no more than about 5 percent, by weight, of an oxide of an alkali or alkaline earth metal. The gaseous stream is contacted with said adsorbent bed at a temperature of from about ambient to about 250° C. for a period of time sufficient to remove at least 90% of the carbonyl sulfide content of said gaseous stream. Preferably, the product gas recovered from the adsorbent bed contains no more than 0.1 ppmv of COS.

The invention is predicated on the discovery that zinc oxide is an effective low temperature adsorbent for COS, and that it can be used to remove substantially all of such impurity from gaseous process streams at commercially practical temperatures and space velocities to concentrations below the detectable limit of COS in such gaseous stream, namely, a concentration in the range of 5-10 parts per billion.

The adsorbent composition may include up to 5 percent, by weight, of an alkali metal oxide and/or an alkaline earth metal oxide. However, the presence of such oxides is not critical for purposes of the invention. The terms "alkali" and "alkaline earth" metals as used herein refer to the metals of groups 1A and 2A, respectively, of the Periodic Table of the elements, Handbook of Chemistry and Physics, 51st. Edition (1970-1971).

The method of removing COS with an adsorbent bed in accordance with the invention is intended to encompass a fixed bed operation as well as the use of a moving or fluidized adsorbent bed. The particular method of contacting the gaseous stream with the adsorbent bed is not critical for purposes of this invention.

The gaseous stream to be purified by the method of the invention is generally a hydrocarbon process stream which in addition to COS may contain other impurities, such as, $SO_2$, $H_2S$ and HCl. The removal of impurities other than COS from the inlet process stream may be advantageously carried out in a primary purification step using regenerable liquid absorbents which are known in the art. Similarly, a portion of the COS in the process stream may be initially removed in, for example, a solution of ethanolamines or alkali hydroxides to reduce the COS concentration to a value above 1 ppmv prior to effecting the desired purification to very low concentrations in accordance with the invention.

Adsorption of COS may be suitably carried out over a temperature range of from ambient to 250° C. Higher temperatures within this range are generally preferred because they favor the reaction kinetics. Thus, bed temperatures from about 150° C. to 240° C. are commonly employed. Suitable space velocities may vary from 3000 to 10,000, defined as the volumetric hourly rate of gas per volume of adsorbent at standard conditions, i.e. 20° C. and 760 mm Hg pressure.

EXAMPLES

The examples summarized in Table I below illustrate the removal of carbonyl sulfide from a gaseous stream using zinc oxide absorbent beds in accordance with the invention.

The adsorbent bed was comprised of a sealed cylindrical 316 stainless steel tube, 1 foot long×1 inch I.D. containing about 60 cc of United Catalysts, Inc. type C7-2-01 zinc oxide catalyst in the form of 3/16 inch diameter pellets. The adsorbent composition was as follows:

| COMPONENT | WEIGHT PERCENT |
|---|---|
| Zinc Oxide | 80 ± 5% |
| Carbon | <0.20 |
| Sulfur | <0.15 |
| Silica | 5-10 |
| Alumina | 4-6 |
| Alkali and Alkaline Earth Metal Oxides | 0.05-0.1 |

The reactor tube was heated externally with resistance heaters insulated with ceramic having a total power output of 1.1 KW to provide the desired bed temperature within the tube as measured and controlled by thermocouples located in the bed in conjunction with a temperature controller. A synthesis gas carrier (44% CO, 56% $H_2$, by volume) was mixed in the appropriate ratio with a known concentrated stream of COS in a synthesis gas of the same composition to provide gaseous streams having the desired concentrations of COS. The total gas flow to the bed was measured by a flow meter. The concentration of COS in the gaseous stream entering the bed was analyzed on-line with a Bendix Model 2600 gas chromatograph equipped with a flame photometric detector capable of detecting COS in concentrations as low as 5 parts per billion in the synthesis gas.

All tubing leading to the adsorbent bed from the gas source consisted of either 304 stainless steel or Teflon (a trademark of E. I. DuPont and Co.). Because of the known tendency of impurities such as HCN, $H_2S$ and COS to adsorb on metal surfaces, such as iron and steel, all the metal tubing was initially washed with caustic and then treated with Siliclad (a water soluble silicone concentrate manufactured by Becton Dickinson and Company, Parsippany, N.J. (07054) to provide an inert coating inside the tubing which effectively precludes adsorption of COS and $H_2S$ on the metal surfaces. The treatment consisted of immersing the tubing in a 1 weight percent solution of Siliclad in water for about 5 seconds followed by rinsing in water to remove excess solution from the metal surface. The coated surfaces were then air dried for about 24 hours.

A synthesis gas stream containing COS at various levels of concentration was passed through the adsorbent bed at the temperatures indicated in Table I. The gas was vented through a back pressure regulator which maintained the pressure in the bed at 100 psig. After steady-state conditions were reached, the inlet feed stream and the reactor effluent were monitored for COS. As noted from the data in Table I, at least 90% of the COS content of the inlet gas stream was removed, in every example, by the adsorbent bed. Thus, the COS concentration in the various product gas streams never exceeded 0.01 ppmv.

Examples 6 and 7 in Table II were intended to demonstrate the use of larger scale beds for COS removal. In these examples the adsorbent bed was comprised of a 316 stainless steel tubular reactor, 6 ft. long×4 inches I.D. containing about 0.5 cubic ft. of the commercial C7-2-01 zinc oxide catalyst described above. The synthesis gas mixture which was passed through the bed had an approximate molar composition of 43% CO, 54% $H_2$, 2.4% $CO_2$, balance COS and $H_2S$, as indicated in Table II. The bed pressure was maintained at 250 psig. As noted from the data in Table II, the COS content of the feedstream to the bed was effectively reduced to a concentration below 0.1 ppmv in the product gas at a space velocity of 2000 hr$^{-1}$ through the bed.

TABLE I

REMOVAL OF COS FROM SYNTHESIS GAS MIXTURE WITH ZINC OXIDE ADSORBENT BEDS

| Example | Bed[1] Temperature, °C. | Space Velocity[2] Standard Conditions (hr.$^{-1}$) | COS Concentration[3] (ppmv) Inlet | Exit |
|---|---|---|---|---|
| 1 | 177 | 300 | 52.0 | ND[4] |
| 2 | 181 | 500 | 21.0 | ND |
| 3 | 184 | 715 | 17.0 | 0.01 |
| 4 | 294 | 330 | 16.7 | ND |
| 5 | 294 | 660 | 23.4 | <0.01 |

[1]Actual bed temperatures were within 2° of the indicated values.
[2]Space velocity is the volume of gas per volume of bed per hour measured at 20° C. and 760 mm Hg.
[3]The inlet and exit concentrations represent the average of at least 3 chromatograph readings to minimize the effect of instrument error; the exit concentrations represent the concentrations achieved at steady-state conditions.
[4]"ND" indicates that no COS was detected in the gaseous stream, i.e., the concentration was below about 5 parts per billion.

TABLE II

REMOVAL OF COS FROM SYNTHESIS GAS MIXTURE WITH ZINC OXIDE ADSORBENT BEDS

| Example | Pressure psig | Bed[1] Temperature (°C.) | Space Velocity[2] Standard Conditions (hr$^{-1}$) | Feed to Bed | | Exit Concentration[3] | |
|---|---|---|---|---|---|---|---|
| | | | | $H_2S$ ppmv | COS ppmv | $H_2S$ ppmv | COS ppmv |
| 6 | 250 | 180–195 | 2000 | 177 | 1.68 | 0.05 | .042 |
| 7 | 250 | 180–195 | 2000 | 246 | 3.09 | 0.13 | .040 |

[1]A temperature gradient existed across the bed from the entrance to the exit, as indicated.
[2]Space velocity is the volume of gas per volume of bed per hour measured at 20° C. and 760 mm Hg.
[3]The inlet and exit concentrations represent the average of at least 3 chromatograph readings to minimize the effect of instrument error at the low concentrations of the examples; the exit concentrations represent the concentrations achieved at steady-state conditions.

What is claimed is:

1. A process for reducing the carbonyl sulfide content of a gaseous stream which has a concentration of carbonyl sulfide of from at least 1 to about 100 parts per million, by volume, which comprises:
    (a) providing an adsorbent bed wherein the adsorbent comprises zinc oxide and contains no more than 5%, by weight, of an oxide of an alkali or alkaline earth metal, and
    (b) contacting said gaseous stream with said adsorbent bed at a temperature of from about ambient to 250° C. for a period of time sufficient to remove at least 90% of the carbonyl sulfide content of said gaseous stream.

2. The process of claim 1 wherein the temperature of said adsorbent is from about 150° C. to about 240° C.

3. The process of claim 1 wherein the concentration of carbonyl sulfide in the gaseous stream is reduced to below 0.1 ppmv.

* * * * *